US009698883B2

(12) United States Patent
Ponnuswamy (10) Patent No.: US 9,698,883 B2
(45) Date of Patent: *Jul. 4, 2017

(54) SYSTEM, APPARATUS AND METHOD FOR INTERGRATED WIRELESS LINK MANAGEMENT FOR A MULTI-POLARIZED ANTENNA SYSTEM

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,640

(22) Filed: Apr. 12, 2016

(65) Prior Publication Data
US 2016/0226568 A1 Aug. 4, 2016

Related U.S. Application Data

(63) Continuation of application No. 14/141,289, filed on Dec. 26, 2013, now Pat. No. 9,312,944.

(51) Int. Cl.
*H04B 7/10* (2017.01)
*H04B 7/06* (2006.01)

(52) U.S. Cl.
CPC ............ *H04B 7/061* (2013.01); *H04B 7/10* (2013.01); *H04B 7/0689* (2013.01)

(58) Field of Classification Search
CPC ......... H04B 7/061; H04B 7/10; H04B 7/0689
See application file for complete search history.

(56) References Cited

U.S. PATENT DOCUMENTS

| | | | |
|---|---|---|---|
| 6,243,565 B1 | 6/2001 | Smith et al. |
| 7,466,776 B2 | 12/2008 | Yuan et al. |
| 7,693,231 B2 | 4/2010 | Ling et al. |
| 8,073,515 B2 | 12/2011 | Rofougaran |
| 8,086,182 B2 | 12/2011 | Rofougaran |
| 8,154,455 B2 | 4/2012 | Landon et al. |
| 8,190,102 B2 | 5/2012 | Rofougaran |
| 8,295,772 B2 | 10/2012 | Petersson et al. |
| 8,649,747 B1 | 2/2014 | Emmanuel et al. |
| 8,761,289 B2 | 6/2014 | Erell et al. |
| 8,774,303 B2 | 7/2014 | Eom et al. |
| 8,897,720 B2 | 11/2014 | Rofougaran |

(Continued)

*Primary Examiner* — Sophia Vlahos
(74) *Attorney, Agent, or Firm* — Brooks, Cameron & Huebsch, PLLC (57) ABSTRACT

According to one embodiment of the disclosure, a non-transitory computer-readable medium comprising instructions which, when executed by one or more hardware processors, causes performance of operations. One of these operations comprises transmitting, from a first device to a second device, a first plurality of frames using a first polarization configuration for a first antenna corresponding to the first device. Based on feedback information associated with the first plurality of frames, a second polarization configuration, which is different than the first polarization configuration, is selected for transmitting a second plurality of frames. Thereafter, the second plurality of frames is transmitted from the first device to the second device using the second polarization configuration for the first antenna.

15 Claims, 6 Drawing Sheets

(56) References Cited

U.S. PATENT DOCUMENTS

| | | | |
|---|---|---|---|
| 9,312,944 B2 * | 4/2016 | Ponnuswamy | H04B 7/061 |
| 2004/0203538 A1 | 10/2004 | Leppanen et al. | |
| 2008/0130790 A1 | 6/2008 | Forenza et al. | |
| 2009/0207093 A1 | 8/2009 | Anreddy et al. | |
| 2009/0227260 A1 | 9/2009 | Anreddy et al. | |
| 2011/0142102 A1 | 6/2011 | Okumura et al. | |
| 2012/0064825 A1 | 3/2012 | Landon et al. | |
| 2013/0005382 A1 | 1/2013 | Landstrom et al. | |
| 2013/0101005 A1 | 4/2013 | Aryanfar | |
| 2013/0102256 A1 | 4/2013 | Cendrillon et al. | |
| 2013/0279631 A1 | 10/2013 | Bowers et al. | |
| 2013/0329649 A1 | 12/2013 | Wernersson et al. | |
| 2014/0146921 A1 | 5/2014 | Walker et al. | |

\* cited by examiner

SYSTEM, APPARATUS AND METHOD FOR INTERGRATED WIRELESS LINK MANAGEMENT FOR A MULTI-POLARIZED ANTENNA SYSTEM

PRIORITY APPLICATION INFORMANTION

This application is a continuation of U.S. application Ser. No. 14/141,289 filed Dec. 26, 2013, the contents of which are incorporated herein by reference.

1. FIELD

Embodiments of the disclosure relate to the field of wireless networks. More specifically, one embodiment of the disclosure relates to management of wireless links between a first network device and a second network device through modification of antenna properties, such as polarization of antennas communicatively coupled to radio frequency (RF) chains for example, to increase de-correlation between spatial streams and enhance link reliability.

2. GENERAL BACKGROUND

Recent advances in antenna technology allow for the construction of compact and efficient multi-polarized antennas. Currently, multi-polarized antennas may be adapted to operate as an omni-directional antenna, a directional antenna, or even an antenna supporting both omni-directional and directional beam (s) (e.g. switched beam antenna). Furthermore, each of the multi-polarized antennas may support at least two types of polarization (e.g., vertical and horizontal). When such multi-polarized antennas are used to construct a MIMO system, for instance an 3×3 MIMO system with three antennas, three transmit radio frequency ("RF") chains and three receive RF chains, each antenna may be individually configured with a specific polarization (e.g. vertical, vertical, horizontal (V,V,H)).

One disadvantage associated with conventional management of wireless communications, especially using multi-polarized antennas, is that the polarization configuration for the antenna system is static in nature. In other words, the polarization selected for the antenna system is set during installation of the electronic device, and this polarization cannot be reset without manual reconfiguration of the electronic device. Hence, conventional technology fails to take into account how the modification of antenna properties at run-time, such as modification of antenna polarization for example, may be used to enhance reliability of the wireless communications.

Furthermore, a particular modulation and coding scheme (MCS) is selected during a wireless transmission in order to achieve a desired data rate. To ensure acceptable quality of service (QoS), each MCS requires a minimum signal-to-noise ratio (SNR) that must be maintained. Conventional rate control schemes are adapted to ensure that acceptable QoS levels are achieved, which typically involves reducing the data rate and/or switching to a different MCS, if necessary. For instance, conventional rate control schemes commonly reduce the data transmission rate and may switch to a different. MCS if the number of retries caused by collisions, the Packet Error Rate (PER) or interference exceeds a maximum threshold, without considering whether the failures experienced during the wireless communication session are due to a lack of de-correlation.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the disclosure relate to a framework within a first network device for modifying its antenna properties in order to enhance de-correlation of wireless signals communicated over a wireless link to a second network device. Such modification of the antenna properties may be conducted at run-time so as to increase reliability of the wireless link while avoiding unnecessary reduction in data rate.

According to one embodiment of the disclosure, in response to detecting transmission failures of wireless messages and reduced quality of service (QoS), the rate control logic within the first network device determines if there is sufficient signal strength (e.g. signal-to-noise ratio "SNR") to support the current (multi-stream) modulation and coding scheme (MCS) used for this wireless communication session. If so, instead of scaling down the data rate, one or more alternative antenna polarization configurations or beam patterns may be selected with subsequent analysis being conducted to determine whether an acceptable QoS (reduced retries or PER) can be maintained with such antenna configuration. As a result, the rate control logic maintains an optimal antenna polarization configuration for the current MCS in use.

I. General Overview

For an antenna system, such as a Multiple-Input and Multiple-Output (MIMO) antenna for example, more than one antenna may be used and each antenna may be configured separately on a per-frame basis in any supported polarization such as a linear polarization type (e.g. vertical, horizontal, etc.) or a non-linear polarization type (e.g. elliptical, circular, etc.). In accordance with one embodiment of the disclosure, the polarization of the antenna system plays a significant role in maintaining reliable device connectivity, especially in a MIMO antenna system (for both single user or multi-user MIMO), as polarization mismatches may result in power loss.

Herein, rate control logic within an electronic device may be configured, based on certain criteria, to modify antenna properties (e.g., polarity, beam pattern, etc.) associated with each RF chain in order to increase the de-correlation between spatial streams. The increased de-correlation may increase the link reliability and data rate (or throughput) of a wireless link, especially when wireless signals using a certain modulation and coding scheme (MCS) are experiencing a high rate of failures due to a lack of de-correlation rather than a lack of sufficient signal strength (e.g. signal-to-noise ratio "SNR"). In other words, link reliability and data rate of the wireless link may be maintained through modification of antenna properties, provided an acceptable signal strength level for the particular MCS is maintained.

Herein, de-correlation generally refers to decreased spatial correlation. Spatial correlation generally refers to a correlation between a signal's spatial direction and the average received signal gain. Theoretically, if the propagation channels between each pair of transmit and receive RF chains are statistically independent and identically distributed, then multiple independent channels with identical characteristics can be created by pre-coding and be used for either transmitting multiple data streams or increasing the reliability (in terms of bit error rate). In practice, the channels between different RF chains are often correlated and therefore the potential multi-antenna gains may not always be obtainable, which is also generally referred to as spatial correlation.

In some embodiments, such as in an MIMO antenna system, a first group of spatial streams is directed to communicating with a first client device, whereas a second group of spatial streams is directed to communicating with a second client device. In such embodiments, the disclosed system is configured to increase not only de-correlation among multiple spatial streams within the same group, but also de-correlation between the first and second groups.

According to this embodiment of the disclosure, the rate control logic, in lieu of merely conducting a transmission retry of a non-received message at the same or different data rate, one or more different polarization configurations (permutations) may be used depending on allowed polarization configurations for this rate and/or client based on previous measurements. The polarization configurations may be pre-determined through analysis of regular data transmissions or through explicit probing (e.g. NULL data transmission(s)). This analysis may be conducted on a periodic or an aperiodic basis.

An optimal antenna polarization configuration for communications with a particular client device may be determined from the stored polarization configurations. Even after being pre-stored, the optimal antenna polarization configuration can be further refined without additional overhead as part of the regular transmission. However, it is contemplated that, to reduce the amount of time necessary to conduct a thorough search for the optimal antenna polarization configuration, certain unlikely configurations (e.g. H,H,H for 3×3 system, etc.) may be avoided. Furthermore, properties associated with the client device may be taken into account based on heuristics of favorable polarizations for certain types or characteristics of the client devices (e.g. client devices having a certain number of RF chains, operating system (OS) type such as iOS®-based or Android®-based client devices, etc.).

Of course, the optimal antenna polarization for client devices may change over time due to the changes in the RF environment. In addition, the optimal antenna polarization configuration is highly dependent on the number of spatial streams. The network device may determine and maintain one or more optimal antenna polarization configurations for a given spatial stream for each client device. The changed antenna configuration may be selected to decrease a spatial correlation among the plurality of spatial streams as received at the second device, where the spatial correlation comprises a similarity between signal properties (e.g. time, phase, amplitude, etc.). A lowering of the spatial correlation between spatial streams increases the ability to distinguish data between different spatial streams. Hence, the optimal polarization on a per-client basis and/or a per-stream basis may be maintained for use by the rate control logic.

Conventionally, when a frame is retried, the same data rate is often retried for a threshold number of times without changing polarization configuration before scaling down the data rate to the next lowest rate level. Herein, according to one embodiment of the invention, when the frame is retried at the same data rate, a different polarization configuration may be used depending on allowed polarization configurations for this data rate and/or client device based on previous measurements.

In summary, one embodiment of the disclosure describes a non-transitory computer readable medium within a first network device that comprises instructions which, when executed by one or more hardware processors, causes performance of operations: (1) transmitting, to a second network device, a first plurality of frames using a first polarization configuration for a first antenna corresponding to the first network device; (2) selecting, based on feedback information associated with the first plurality of frames, a second polarization configuration different than the first polarization configuration for transmitting a second plurality of frames; (3) transmitting, from the first device to the second device, the second plurality of frames using the second polarization configuration for the first antenna. As an illustrative example, the feedback information includes information that may be analyzed to improve the quality of transmission such as Acknowledgement (ACK) messages, Signal-to-Noise (SNR) metrics; power level metrics in efforts to use the least amount of transmit power while complying with throughput transmission requirements.

Another embodiment of the disclosure describes a non-transitory computer readable medium within a first network device that comprises instructions which, when executed by one or more hardware processors, causes performance of operations: (1) selecting a first plurality of configurations for a corresponding plurality of antennas for a first network device; (2) transmitting, from a first network device to a second network device, a first plurality of frames distributed over a plurality of spatial streams using the plurality of antennas of the first network device with the first plurality of configurations; (3) selecting, based on feedback information associated with the first plurality of frames, a second plurality of configurations for the plurality of antennas to transmit a second plurality of frames, at least one configuration in the second plurality of configurations being different than a configuration in the first plurality of configurations; (4) transmitting, from the first network device to the second network device, the second plurality of frames distributed over the plurality of spatial streams using the plurality of antennas of the first network device with the second plurality of configurations.

II. Terminology

Herein, certain terminology is used to describe features within embodiments of the invention. For example, the term "network device" generally refers to electronic equipment configured with an antenna system that enables transmission and/or receipt of wireless messages over a wireless network. Hence, the network device is further adapted with circuitry to support wireless connectivity with other network devices being part of the wireless network. Different types of network devices may include, but are not limited to (1) a client device and (2) an edge device.

Herein, client device may be a stationary network device (e.g., desktop computer, television, set-top box, video gaming console, etc.) or a mobile network device capable of connecting to one or more wireless networks. Illustrative examples of mobile network devices may include a tablet, laptop, netbook, bar-code scanner, a digital camera, and/or a mobile handset such as a smartphone, personal digital assistant "PDA", or the like. Likewise, illustrative examples of an edge device, which at least partially controls access to a network, may include a wired access point, wireless access point, wireless base station, a cellular base station, or any device configured as a hot spot or gateway for network connectivity.

It is contemplated that a network device includes hardware logic such as One or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. Architecture

Figure 1:
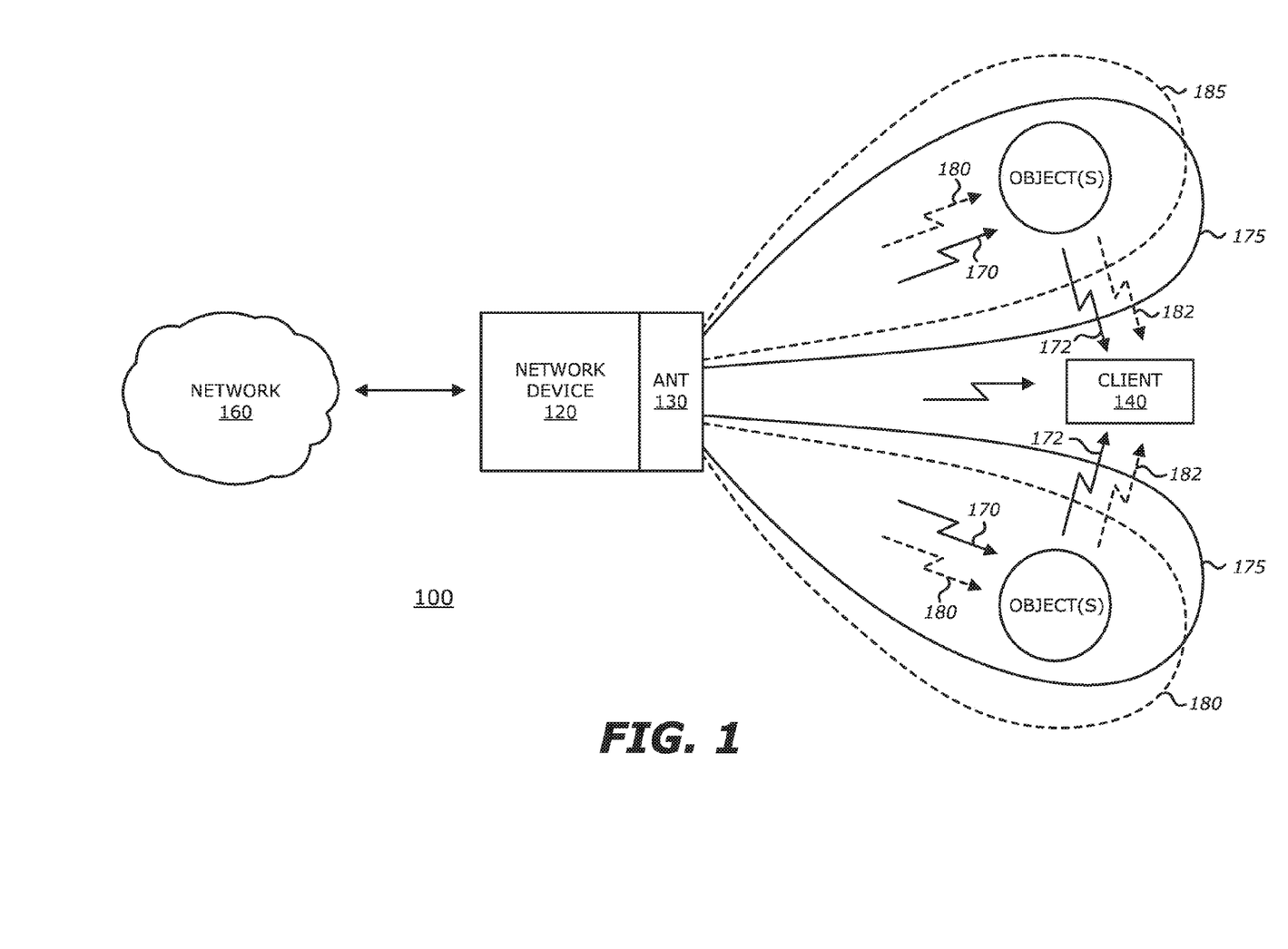
FIG. 1 is an exemplary block diagram of a network device operating within a wireless network environment.

According to one embodiment of the disclosure, as shown in FIG. 1, a first network device 110 operating within a wireless network environment 100 is shown. Herein, first network device 120 operates as a gateway to control access by another network device (e.g. client device 140) to a public or private network (network 160) such as the Internet or an Intranet. The first network device 120 may include an access point (APs) that controls connectivity where wireless network environment 100 is a WiFi™ network. Of course, it is contemplated that the first network device 120 may operate as a cellular base station that controls connectivity where wireless network environment 100 is a cellular network, and/or a WiMAX™ network.

According to one embodiment of the disclosure, first network device 120 transmits wireless signals to the client device 140 via an antenna system 130. Operating as a directional or an omnidirectional antenna, antenna system 130 comprises a plurality of radio frequency (RF) chains (see FIG. 2) that transmit wireless signals 170 according to a first antenna polarization configuration 175. These wireless signals 170 undergo influences (e.g. reflection and/or refraction off objects, absorption, interference, phase modification, etc.) that create one or more multipaths 172 at client device 140. These multipath(s) 172 provides a first level of de-correlation.

The first network device 120 receives feedback information in order to monitor wireless communications, and where applicable, improve the quality of wireless transmissions. The feedback information may be information accessed from returned signaling that identifies the quality of the transmission such as one or more returned Acknowledgements (ACK), measured signal strength. (e.g. SNR measured from returned wireless signals), transmit power level, or the like.

Based on feedback information that may be used to detect QoS levels falling below a prescribed threshold (e.g. a number of retries at a particular MCS exceeding a threshold or a PER exceeding a particular threshold), first network device 120 may commence transmitting wireless signals 180 with a second antenna polarization configuration 185, which may increase de-correlation between spatial streams through one or more multipaths 182 that provide a second level of de-correlation at client device 140. The second de-correlation level may exceed the first de-correlation level, which may reduce the measured signal strength in some cases but increase the data rate so that modification of the MCS may be avoided where the reduced signal strength is still acceptable for the particular MCS.

It is contemplated that, in lieu of transmitting wireless signals 170 and 180 with different antenna polarization configurations, the first multipath 172 and second multipath 182 may be created by transmission of wireless signals 170 and 180 with different beam patterns. Furthermore, it is contemplated that antenna system 130 may be configured as an omni-directional antenna or at least support omni-directional transmissions in lieu of a directional-based antenna system as shown.

Figure 2:
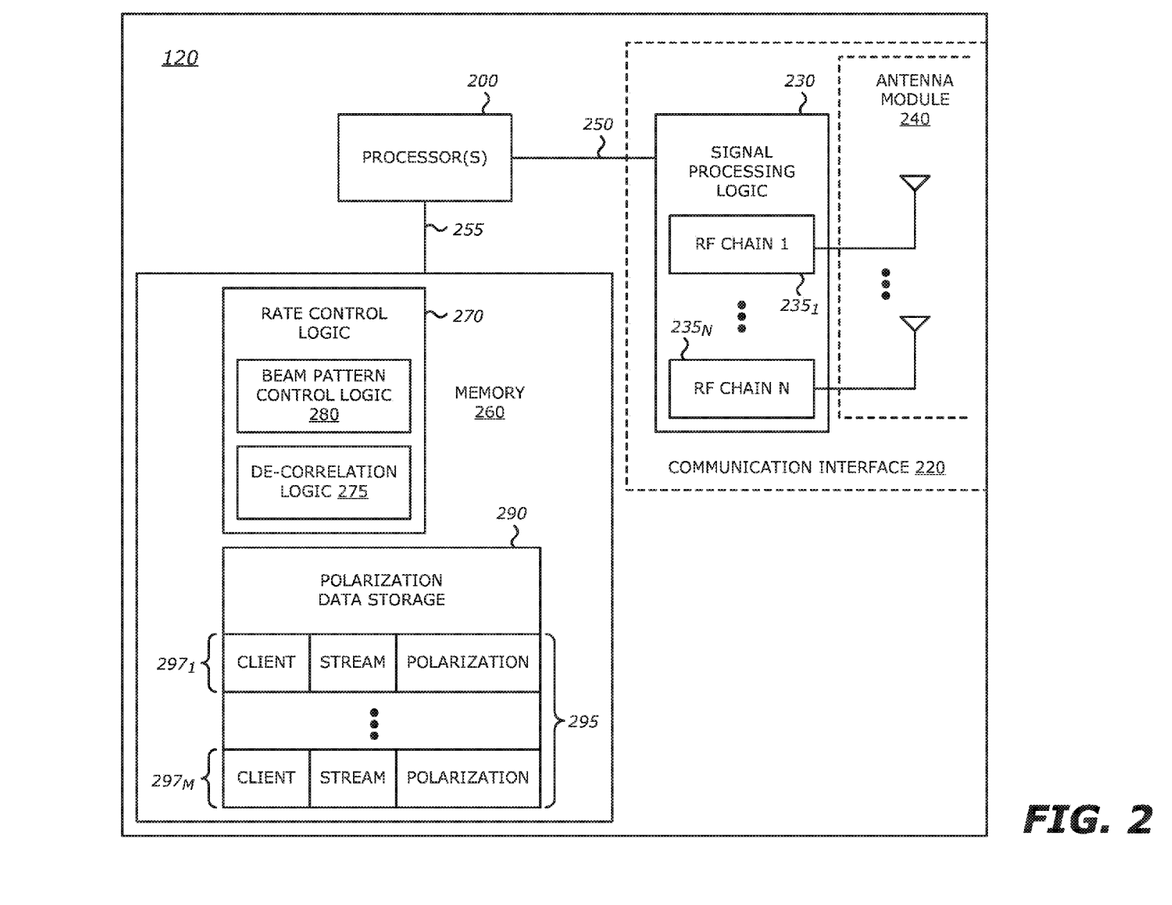
FIG. 2 is an exemplary block diagram of logic associated with network device of FIG. 1.

Referring now to FIG. 2, an exemplary block diagram of logic associated with network device 120 of FIG. 1 is shown. Network device 120 comprises one or more processors 200 that are coupled to a communication interface 220 via a first transmission medium 250. According to this embodiment of the disclosure, the communication interface 220 comprises signal processing logic 230 and an antenna module 240, which includes one or more antennas for supporting wireless communications with other network devices. However, it is contemplated that communication interface 220 may be implemented as a physical interface including one or more ports for wired connectors.

Herein, signal processing logic 230 includes one or more RF chains $235_1$-$235_N$ (N≥1), which are adapted to process a signal targeted for wireless transmission by converting the signal from a digital form to an analog form. Thereafter, the analog signal is processed (e.g. signal modulation, etc.) prior to transmission over an antenna. Each of the RF chains $235_1$-$235_N$ is further adapted to alter properties of its corresponding antenna being part of antenna module 240 (e.g. polarization, beam pattern types, power setting, etc.) as described below. For instance, according to one example, each of the RF chains $235_1$-$235_N$ is able to pre-distort the polarization of a corresponding transmitted wireless signal, which can provide significant improvement, especially for MIMO antenna systems, on link reliability by increased de-correlation where a certain MCS fails due to a lack of de-correlation rather than a lack of sufficient SNR.

Processor(s) 200 is further coupled to persistent memory 260 via a second transmission medium 255. According to one embodiment of the disclosure, persistent storage 260 may include (i) rate control logic 270, including de-correlation logic 275 and beam pattern control logic 280; (ii) a polarization data storage 290, including a plurality of antenna polarization configurations 295 on a "per client device" basis and/or "per spatial stream" basis.

Rate control logic 270 comprises one or more software modules that are configured to adjust antenna properties on a per message (e.g. per frame) basis. For instance, according to one embodiment of the disclosure, de-correlation logic 275 within the rate control logic 270 may be configured to adjust antenna properties between successive messages based on communications with a particular client device or based on communications over a particular spatial stream. These antenna properties may be directed to the polarity of transmitted and/or received signaling as handling by each RF chain. As an example, for a 3×3 system having a polarization configuration (V,V,H), namely the first and second antennas support a vertical polarity while a third antenna supports a horizontal polarity, the polarization may be altered so that the second antenna has a horizontal polarity (V,H,H) or a non-linear polarity (V,E,H), where "E" denotes an elliptical polarization.

These polarization configurations 295 are stored within polarization data storage 290, where the testing to determine "M" (M≥2) polarization configurations $297_1$-$297_M$ for storage (e.g. polarizations that provide better data rates for a particular MCS than realized data rates with other polarizations) may be conducted through transmission of regular data transmissions or probing messages (e.g. NULL data transmission(s)) at times where the network device 120 is not conducting actual data transmissions.

Herein, the polarization configurations $297_1$-$297_M$ may be directed to optimal data rates associated with wireless signal transmissions directed to a particular client device and/or a finer granularity of optimal data rates associated with a particular spatial stream directed to the particular client device (e.g. first spatial stream "SS" with a vertical polarity; second SS with a horizontal (H) polarity; third SS with an elliptical (E) polarity, or the like. For instance, in multi-stream communications with a client device, the network device may utilize a first polarization configuration $297_1$ for a first spatial stream and a second polarization configuration $297_M$, which is different than the first polarization configuration, for a second spatial stream. Also, the optimal antenna polarization configuration for each different spatial stream may be stored as well (e.g. where network device's 3×3 system supports one spatial stream "SS", use polarization V,V,V; where supporting two SS, use polarization V,H,V; where supporting three SS, use polarization V,V,E; etc.)

In order to reduce the amount of time necessary to conduct a thorough search for optimal polarization configurations for storage within data store 290, certain unlikely configurations (e.g. H,H,H for 3×3 system) may be avoided by de-correlation logic 275. Furthermore, properties associated with the client device may be taken into account based on heuristics of favorable polarization configurations for certain types of client devices (e.g. client devices having two RF chains normally operate best at V,H polarities while three RF chains normally operate best at V,V,H; etc.).

Similarly, rate control logic 270 comprises beam pattern control logic 280 that comprises one or more software modules configured to adjust antenna properties on a per message (e.g. per frame) basis, where the antenna properties may be directed to a particular beam pattern used by an RF chain for message transmission and/or reception. As another example, again for a 3×3 system, the first and second RF chains $235_1$ and $235_2$ may support a first radiation pattern having a narrower beamwidth with a high magnitude while the third RF chain $235_3$ may support a broader beamwidth with a main beam having a lesser magnitude.

Figure 3:
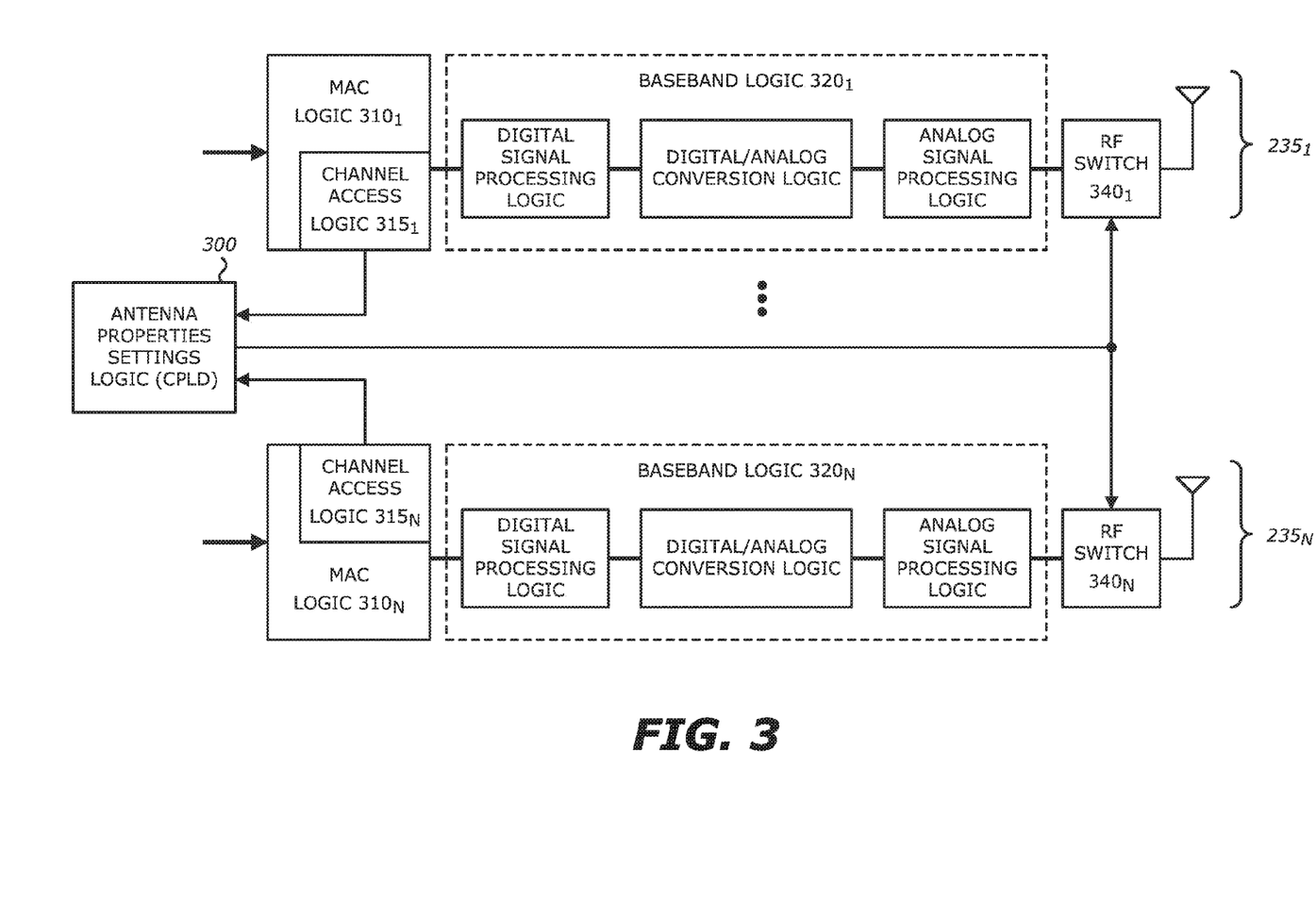
FIG. 3 is an exemplary block diagram of multiple radio frequency (RF) chains associated with signal processing logic being part of the logic of FIG. 2.

Referring now to FIG. 3, an exemplary block diagram of multiple RF chains $235_1$-$235_N$ associated with signal processing logic 230 of FIG. 2 is shown. Herein, a first RF chain $235_1$ comprises media access control (MAC) logic $310_1$, baseband logic $320_1$, and RF switch logic $340_1$. Similarly, RF chain $235_N$ comprises media access control (MAC) logic $310_N$, baseband logic $320_N$, and RF switch logic $340_N$. Herein, media access control (MAC) logic $310_1$-$310_N$ is directed to routing feedback information associated with the state of the wireless communication session supported by RF chains $235_1$-$235_N$ while each of baseband logic $310_1$-$310_N$ includes at least a digital signal processing logic directed to processing digital signals, a digital/analog conversion logic directed to converting digital signals into an analog form that is utilized by wireless signals transmitted from one or more antennas, and an analog signal processing logic directed to processing analog signals.

Normally implemented as a programmable logic device (e.g. CPLD), antenna properties setting logic 300 is communicatively coupled to channel access logic $315_1$-$315_N$ of MAC logic $310_1$-$310_N$, where channel access logic $315_i$ (i=1 . . . N) allows several spatial streams (or signals) to share the same communication channel or physical medium. Based on feedback signaling received by RF receive chains and routed thereto, antenna properties setting logic 300 is configured to set RF switch logic $340_1$-$340_N$ in accordance with altered polarization, beam patterns, or the like. In particular, each RF switch logic $340_1$-$340_N$ includes a data store of polarization configurations and/or beam patterns as described above.

IV. Network Connectivity Schemes

Figure 4:
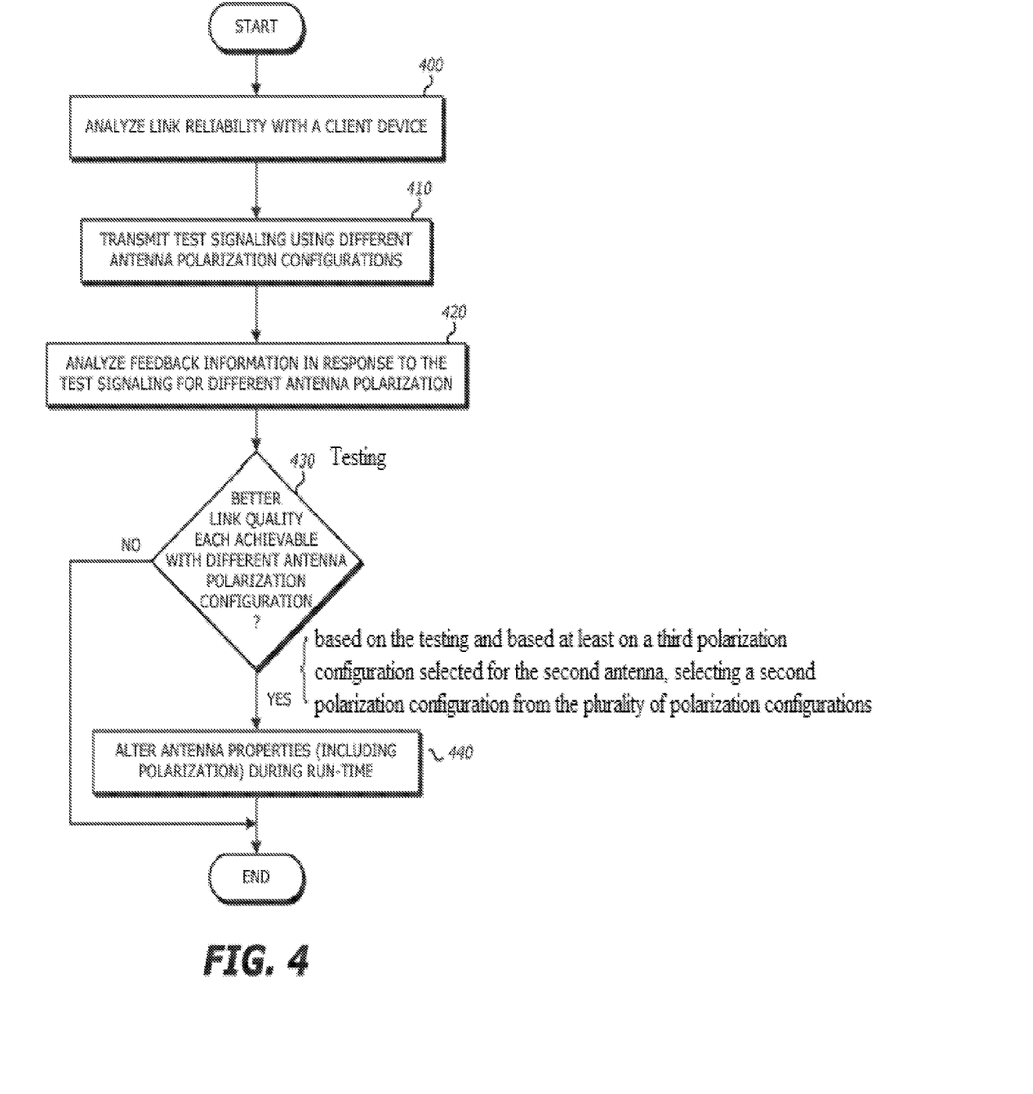
FIG. 4 is a general illustrative embodiment of run-time operations conducted by the network device of FIG. 1 to alter antenna properties in order to improve link reliability.

Referring to FIG. 4, a general illustrative embodiment of run-time operations conducted by the network device to alter antenna properties, such as polarization for example, to improve link reliability is shown. First, the network device may analyze its link reliability with a client device (block 400). This analysis may involve determining the signal-to-noise ratio (SNR) measured by the network device for signals from the client device, determining if the SNR is greater than a prescribed threshold for the MCS currently utilized for communications with client device, and determining the data rate (throughput) from the client device is maintained above a prescribed threshold. During periods of silence where data transmissions/receptions are not being conducted, the network device sends test signaling using different antenna polarization configurations and analyzes the feedback information received in response to the test signaling (blocks 410 and 420). This feedback information includes SNR, measured data rate (taking into account retries), or the like.

Based on the feedback information, a determination is made whether a better link quality is achievable using a different antenna property such as a different antenna polarization configuration (block 430). If so, one or more antenna properties (e.g. antenna polarity) are altered during run-time and such alteration may be on a message-by-message basis (block 440). Otherwise, the same antenna properties are used.

Figure 5:
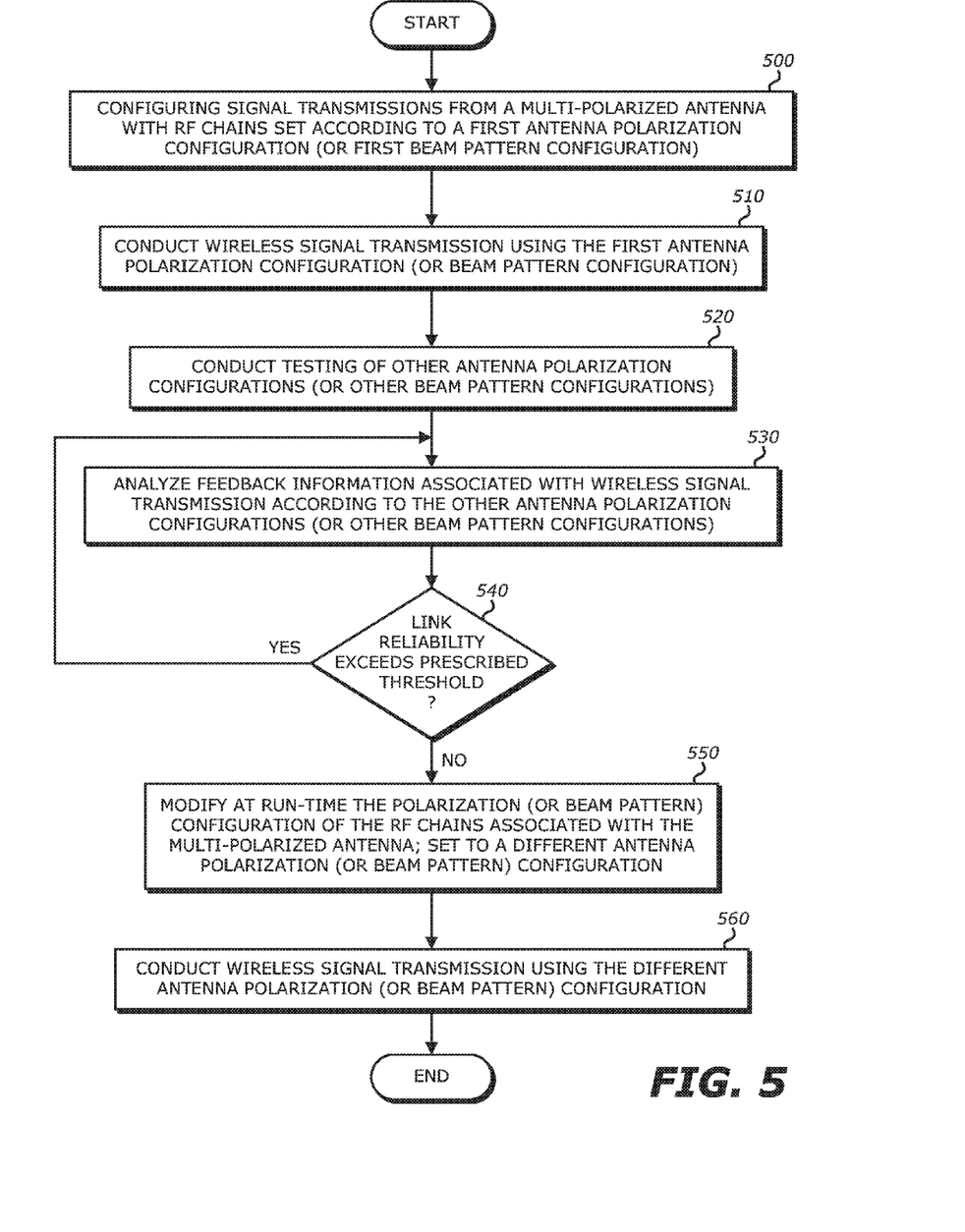
FIG. 5 is an exemplary an illustrative embodiment of run-time operations conducted by the network device of FIG. 1 having a multi-polarized antenna to alter the antenna properties.

Referring now to FIG. 5, an illustrative embodiment of run-time operations conducted by the network device having a multi-polarized antenna to alter antenna properties, such as the polarization configuration (or beam pattern configuration) for example, to improve link reliability is shown. Herein, adjustment of the antenna polarization will be described. However, it is contemplated that alternation of another antenna property, such as beam pattern for example, may be used in lieu of altering antenna polarization.

As described in FIG. 5, RF chains associated with a multi-polarized antenna are set according to a first antenna polarization configuration (or a first beam pattern configuration), as set forth in block 500. After setting of the RF chains, one or more wireless signal transmissions are conducted using the first antenna polarization configuration (or first beam pattern configuration), as set forth in block 510. Contemporaneous with these wireless signal transmissions in accordance with the first antenna polarization configuration (or a first beam pattern configuration), such as prior, after or between successive transmissions, the testing of other polarization configurations (or beam pattern configurations) may be conducted. Such testing comprises the transmission of wireless test messages (e.g. NULL data frames, etc.) and receipt of feedback information associated with the wireless test messages which is subsequently analyzed (block 520 and 530). Such feedback information may be in the form of 802.11 Acknowledgement frames, measured SNR, data rate metrics, or other factors.

Thereafter, link reliability is analyzed to determine whether such reliability exceeds a prescribed threshold (block 540). For instance, for a given, MCS, the link reliability may be based at least in part on the signal strength (e.g. SNR), Packet Error Rate and the current data rate (e.g., Modulation and Coding Rate). If so, wireless signal transmissions will continue in accordance with the first antenna polarization configuration (or first beam pattern configuration). However, if the link reliability fails below the prescribed threshold during run-time, the polarity of the antennas associated with a multi-polarized antenna may be modified according to a second antenna polarization configuration (or a second beam pattern configuration), as set forth in block 550. The second antenna polarization configuration (or second beam pattern configuration) is different than the first antenna polarization configuration (or first beam pattern configuration).

After setting the RF chains, one or more wireless signal transmissions are conducted using the second antenna polarization configuration (or second beam pattern configuration), as set forth in block 560.

Figure 6:
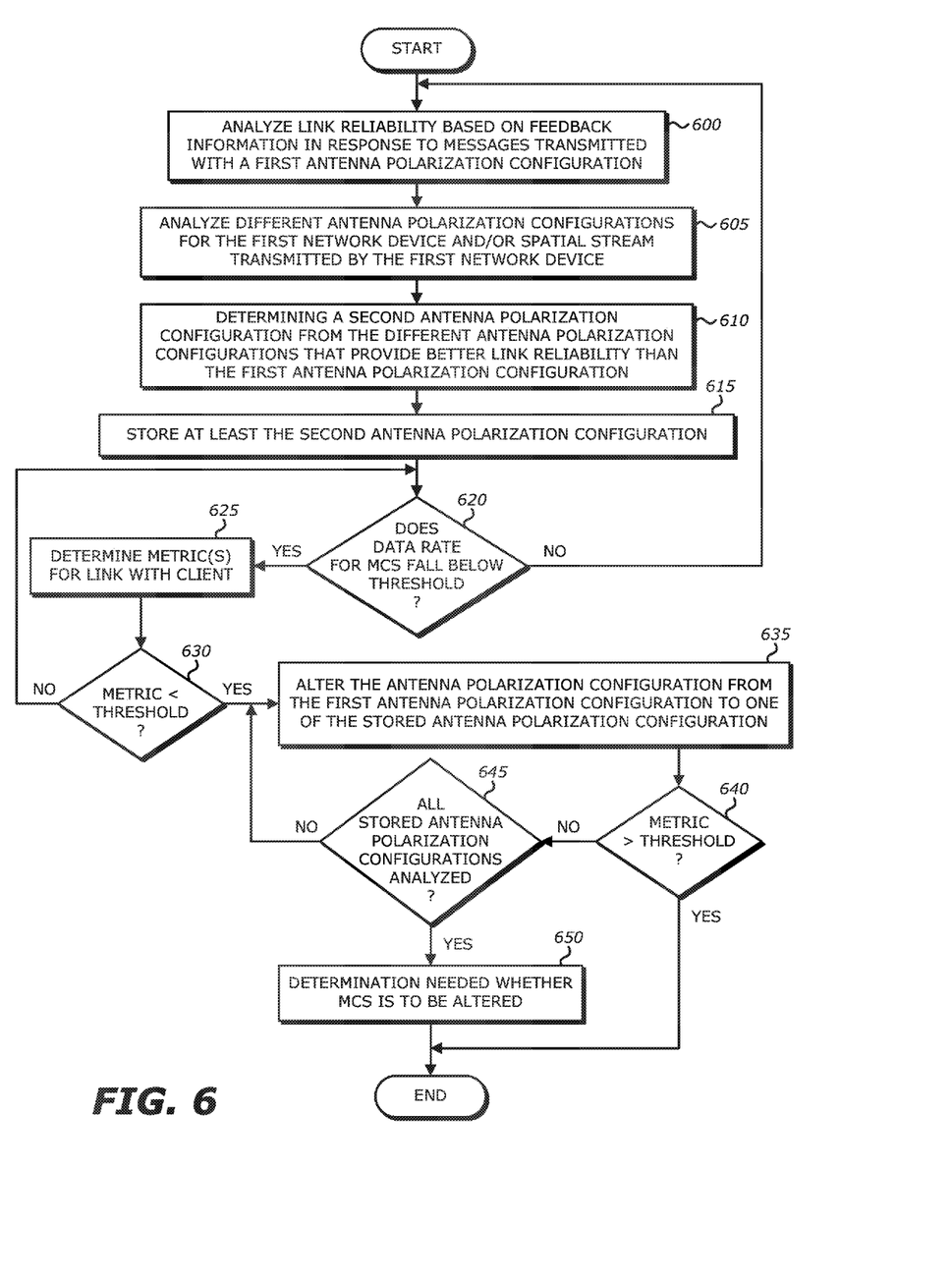
FIG. 6 is a more detailed illustrative embodiment of run-time operations conducted by the network device of FIG. 1 with a multi-polarized antenna to alter antenna properties.

Referring now to FIG. 6, a more detailed illustrative embodiment of run-time operations conducted by the network device with a multi-polarized antenna to alter antenna properties, such as polarization for example, is shown. Herein, based on feedback information in response to messages transmitted in accordance with a first antenna polarization configuration, the link reliability for communications between a first network device and a second network device is analyzed (block 600). Such link reliability may be further analyzed for each of the spatial streams transmitted from the first network device in accordance with (i) the first antenna polarization configuration and (ii) other antenna polarization configurations (block 605).

Upon determining that a second antenna. polarization configuration is different from and provides better link reliability than the first antenna polarization configuration, the second antenna polarization configuration is stored in a data store for subsequent access by rate control logic of the first network device (blocks 610 and 615).

Upon detecting that the data rate associated with a current MCS falls below a prescribed threshold, a determination is made whether another metric, such as SNR for example, falls below a prescribed minimum threshold (blocks 620, 625 and 630). If the analyzed metric does not fail below its prescribed minimum threshold, the metric is re-analyzed while the data rate associated with the current MCS remains below the prescribed threshold. However, if the analyzed metric fell below its prescribed minimum threshold, during run-time, the antenna polarization configuration for the multi-polarized antenna is altered from the first antenna polarization configuration to the second antenna polarization configuration (block 635).

Thereafter, if the data rate associated with the current MCS rises above the prescribed threshold, the first network device uses the second antenna polarization configuration for communications with the second network device (block 640). Otherwise, if all of the stored antenna polarization configurations have not been analyzed, still during run-time, the antenna polarization configuration for the multi-polarized antenna is altered from the second antenna polarization configuration to a third antenna polarization configuration and the data rate associated with the current MCS is analyzed again (blocks 645, 635 and 640). If all of the stored antenna polarization configurations have been analyzed, the process exits for subsequent analysis as to whether the MCS needs to be altered to reduce the data rate (block 650).

Lastly, it is noted that the functionality associated with the non-transitory computer-readable medium described above may be captured by a network device that includes at least one device including a hardware processor and the system configured to perform operations identical to the operations described for the computer-readable medium.

This invention may be embodied in other forms without departing from the spirit or essential attributes thereof. Accordingly, reference should be made to the following claims, rather than to the foregoing specification, as indicating the scope of the invention.

What is claimed is:

1. A first network device, comprising:
a first antenna and a second antenna;
a processor; and
instructions that when executed by the processor cause the first network device to:
transmit, to a second network device, frames using a first polarization configuration of the first antenna;
select a second polarization configuration of the first antenna different than the first polarization configuration to transmit frames, wherein the selection of the second polarization configuration comprises:

testing a plurality of polarization configurations for at least the first antenna; and based on the testing and based at least on a third polarization configuration selected for the second antenna, selecting the second polarization configuration from the plurality of polarization configurations; and transmit, to the second network device, frames using the second polarization configuration of the first antenna.

2. The first network device of claim 1, wherein the network device is an access point that controls connectivity to a wireless network environment.

3. The first network device of claim 2, wherein the wireless network environment is a WIFI network.

4. The first network device of claim 1, wherein the network device is a cellular base station that controls connectivity to a wireless network environment.

5. The first network device of claim 1, wherein the wireless network environment is a cellular network.

6. The first network device of claim 1, including instructions to select the second polarization configuration based on feedback information associated with the frames transmitted using the first polarization configuration of the first antenna.

7. The first network device of claim 1, wherein the second network device is a mobile client device.

8. The first network device of claim 1, wherein the second network device is a stationary client device.

9. The first network device of claim 1, wherein the first network device is a mobile device that controls connectivity to a wireless network environment.

10. A non-transitory computer readable medium comprising instructions which, when executed by a hardware processor of a first network device, cause the first network device to:

transmit, to a second network device, frames using a first polarization configuration of a first antenna corresponding to the first network device;

based on feedback information associated with the frames, select a second polarization configuration of the first antenna different than the first polarization configuration for transmitting additional frames, wherein the selecting of the second polarization configuration comprises:

test a plurality of polarization configurations of at least the first antenna; and based on the testing operation, select the second polarization configuration from the plurality of polarization configurations based at least on a third polarization configuration selected for a second antenna corresponding to the first network device; and transmit the additional frames using the second polarization configuration of the first antenna.

11. The medium of claim 10, including instructions to transmit the additional frames using the second polarization configuration of the first antenna to the second network device.

12. The medium of claim 11, wherein the second polarization configuration is selected to alter a spatial correlation among a plurality of spatial streams as received at the second network device.

13. A method, comprising:

transmitting, from a first network device to a second network device, a first plurality of frames using a first polarization configuration of a first antenna;

selecting a second polarization configuration of the first antenna different than the first polarization configuration to transmit a second plurality of frames; wherein the selection of the second polarization configuration comprises:

testing a plurality of polarization configurations for at least the first antenna; and based on the testing operation, selection of the second polarization configuration from the plurality of polarization configurations based at least on a third polarization configuration selected for a second antenna of the first network device; and transmitting the second plurality of frames to the second network device using the second polarization configuration of the first antenna.

14. The method of claim 13, wherein selecting the second polarization configuration occurs during run-time of the first network device.

15. The method of claim 14, including selecting the second polarization configuration in response to a link reliability between the first network device and the second network device falling below a reliability threshold.

* * * * *